United States Patent Office 3,661,996
Patented May 9, 1972

3,661,996
PURIFICATION OF N-SUBSTITUTED
HYDROXYLAMINES
Henry Bader, Newton Center, and Alexander Boag, Arlington, Mass., assignors to Polaroid Corporation, Cambridge, Mass.
No Drawing. Filed Feb. 24, 1969, Ser. No. 801,820
Int. Cl. C07c 83/00, 83/02, 85/16
U.S. Cl. 260—584 C            15 Claims

ABSTRACT OF THE DISCLOSURE

N-substituted hydroxylamines are separated from non-basic impurities in their crude reaction mixtures by contacting the crude mixture with a strongly acidic ion exchange resin and removing the non-basic impurities by elution with an aqueous solution of an organic eluent. The hydroxylamine is then eluted from the resin using aqueous acid, and subsequently isolated from aqueous solution by solvent extraction.

This invention relates to a process of separating impurities from hydroxylamines and, more particularly, to a process of purifying crude reaction mixtures of N-substituted hydroxylamines.

These compounds are well-known in the art and find many uses including that of developing agents in photographic processing compositions. While N-substituted hydroxylamines have been prepared by various techniques, as for example, by the pyrolysis of amine oxides, they are usually produced on a commercial scale by the oxidation of the corresponding amine.

Unfortunately, a major problem encountered in the manufacture of hydroxylamines is the formation of various impurities as a result of side reactions and some decomposition of the reaction product. The resulting crude reaction mixtures contain, besides hydroxylamine product, small amounts of non-basic impurities which may include such substances as the nitrone, the oxime and the corresponding aldehyde, acid and alcohol; sometimes also amides derived from the acid. Where the N,N-disubstituted hydroxylamine is synthesized by oxidation of the corresponding secondary amine, the crude reaction mixture may also contain varying amounts of unreacted starting amine. Before the product is used, especially in photographic applications, it must be separated from these and other impurities that may be present.

Many purification processes have been proposed and used to remove impurities from N-substituted hydroxylamines in the crude reaction product of its synthesis. Some of the processes are commercially unattractive because of complicated steps which are necessarily time-consuming and result in poor product recovery, while other processes, though relatively simple and straightforward, also suffer from poor recoveries and a product having less than the desired high degree of purity. For example, in processes where a salt of the hydroxylamine is formed in aqueous solution, followed by extraction with an organic solvent and recovery of product from the aqueous solution, recoveries are 80% at best and usually are in the neighborhood of 65%. The purity of the product is generally below 90%. The low recoveries and the low purity of the product are attributed partly to an incomplete extraction of some of the impurities, but mainly to decomposition during purification. Most of the impurities, though extracted in such a process, are being regenerated by degradation of the hydroxylamine product during the extraction.

An object of the present invention, therefore, is to provide an improved process of separating N-substituted hydroxylamines from impurities present in its crude reaction mixture wherein hydroxylamine product of exceptionally high purity is recovered in excellent yields.

Another object of the present invention is to provide a process of separating N-substituted hydroxylamines from non-basic substances in its reaction mixture which process may be carried out on a commercial scale in a rapid and efficient manner.

A further object of the present invention is to provide N-substituted hydroxylamines of high quality suitable for use as photographic developing agents.

Other objects of the invention will in part be obvious and will in part appear hereinafter.

The invention accordingly comprises the processes involving the several steps and the relation and order of one or more of such steps with respect to each of the others, and the compositions and products possessing the features, properties and the relation of elements which are exemplified in the following detailed disclosure, and the scope of the application of which will be indicated in the claims.

In accordance with this invention, it has now been found that N-substituted hydroxylamines of high purity may be recovered in high yields from crude reaction mixtures comprising the hydroxylamine product and non-basic impurities by a process which comprises, in combination, the steps of (a) contacting a solution of the crude reaction mixture in water and a water-miscible organic liquid with a strongly acidic ion exchange resin, (b) treating the contacted resin with an aqueous solution of a water-miscible organic eluent to remove said non-basic impurities from said contacted resin, (c) subsequently treating said contacted resin with an aqueous solution of an acid to remove said hydroxylamine product from said resin, (d) adjusting the pH of the resulting aqueous acid solution to about 6, and (e) extracting the aqueous solution with an organic solvent to recover the hydroxylamine product therefrom. Where consistently high purity of 98 to 99% is of prime importance, the crude reaction mixture, after its pH is adjusted to about 6, may be extracted with an appropriate organic solvent, and the solvent removed, before contacting with the resin. The residue obtained from the extraction, after being diluted, is then processed according to the procedure outlined above.

In both variations of the procedure, extraction with an organic solvent of a solution adjusted to a pH of about 6 allows a quantitative removal of the less basic hydroxylamine and leaves behind the more basic starting amine as a salt. Thus, removal of the starting amine may be effected before and/or after the ion-exchange purification which, as was stated, removes only non-basic impurities.

By separating N-substituted hydroxylamines from crude reaction mixtures according to the above method, hydroxylamine product may be recovered in much higher amounts than previously. Also, the desired hydroxylamine product may be obtained in purer form of 95% and above. Another prominent advantage of the present process is its simplicity, both in the number and sequence of steps which are uncomplicated and do not require elaborate or expensive equipment. Because of its simplicity and the relative ease with which it may be performed, the present method may be readily adapted to the isolation and purification of N-substituted hydroxylamines on a commercial scale.

Though procedures employing a combination of solvent extraction with other separation techniques have been used in the isolation and purification of various organic compounds including amines, the improved results achieved using the method of the present invention are highly unexpected. It is believed that the significantly higher recoveries of a purer product is due primarily to the use of an ion exchange resin together with an aqueous solution of an organic eluent, e.g., aqueous methanol solution, for removing the non-basic substances from the resin contacted with the diluted reaction mixture. Apparently, a solution comprising water together with a water-miscible organic liquid having good eluting properties provides an environment wherein the non-basic impurities which tend to catalyze decomposition of the product may be readily washed away while the hydroxylamine and starting amine (if present) will remain fixed to the resin in a salt form until the resin is contacted with acid solution. In the absence of an organic liquid eluent the removal of the nonbasic impurities is not complete, as they tend to be adsorbed physically on the resin, from which they are partly removed on regeneration with acid and thus recontaminate the product. The use of an organic liquid such as methanol with the water as the eluent is not only contrary to prior practice but is contrary to the recommendation that methanol and similar organic materials not be employed with certain of the strongly acidic resins in common use. While the present process is particularly illustrated by the purification of an N,N-disubstituted hydroxylamine, it is equally useful in the purification of N-monosubstituted hydroxylamines.

For a fuller understanding of the nature and objects of the invention, reference should be had to the following detailed description.

The present invention is applicable to the purification, i.e., the separation of impurities from N-substituted hydroxylamines corresponding to the formula:

$$R^1-N-R^2$$
$$|$$
$$OH \quad (A)$$

wherein each of $R^1$ and $R^2$ are independently selected from the group consisting of hydrogen, alkyl, cycloalkyl, alkoxyalkyl, aralkyl, alkoxyalkoxyalkyl, and an alkenyl radical, not more than one of $R^1$ and $R^2$ being hydrogen, and $R^1$ and $R^2$ when taken together represent the atoms necessary to complete a heterocyclic ring selected from piperidyl, pyrrolidyl and N-alkylpiperazinyl. For photographic use, the alkyl, alkoxyalkyl and alkenyl radicals preferably contain from 1 to 3 carbon atoms, but may contain more carbon atoms provided the resulting compound is soluble in water.

Specific hydroxylamines encompassed by the above formula that can be purified by the present process include:

(1) $CH_3O - C_2H_4 - \underset{OH}{N} - C_2H_4 - OCH_3$

N,N-di-(2-methoxyethyl)hydroxylamine (2) $C_2H_5O - C_2H_4 - \underset{OH}{N} - C_2H_4 - OC_2H_5$ N,N-di-(2-ethoxyethyl)hydroxylamine (3) $CH_3O - C_2H_4O - C_2H_4 - \underset{OH}{N} - C_2H_4 - OC_2H_4 - OCH_3$ N,N-di-(2-methoxyethoxyethyl)hydroxylamine (4) $C_2H_5O - C_2H_4 - \underset{OH}{N} - C_2H_5$ N-ethyl-N-2-ethoxyethylhydroxylamine (5) $C_2H_5O - C_2H_4 - \underset{OH}{N} - CH_2 - CH = CH_2$ N-allyl-N-2-ethoxyethylhydroxylamine As indicated above, N-substituted hydroxylamines may be synthesized in a variety of ways, for example, by direct alkylation of hydroxylamine with an appropriate alkylating agent in the presence of a dipolar aprotic solvent as disclosed and claimed in copending application Ser. No. 652,420 of Henry Bader, filed July 11, 1967, now U.S. Pat. No. 3,491,151 issued Jan. 20, 1970 or by oxidation of the corresponding secondary amine in the presence of a metal sequestering agent, either batchwise or in a continuous manner, as disclosed and claimed in copending applications Ser. No. 652,714 of Henry Bader and Sheldon Buckler, filed July 12, 1967, now U.S. Pat. No. 3,467,711 issued Sept. 16, 1969, and Ser. No. 801,550 of Henry Bader and Alexander Boag, filed on even date herewith. Since all of the methods give rise to similar non-basic impurities, the present process is applicable to separating the above-described hydroxylamines from crude reaction mixtures, regardless of the mode of preparation of hydroxylamine and whether the synthesis of the hydroxylamine is conducted in the absence or in the presence of water and/or an organic diluent. In carrying out the present process, the crude reaction mixture is appropriately diluted to provide a solution comprising water and an organic liquid. Preferably, the organic liquid is one that possesses good eluting properties as will be discussed below.

To separate the non-basic impurities from the product, the diluted reaction mixture is contacted with a strongly acidic ion exchange resin. A considerable number and variety of such resins are known and are best exemplified by those having a polymer matrix as the structural portion and sulfonic acid groups as the functional portion. Included among such resins are those based on a cross-linked phenolic matrix and prepared by sulfonation of phenol-formaldehyde polymers or by condensation of phenolsulfonic acid with formaldehyde, or by the alkaline condensation of sodium phenoxide, sodium sulfite and formaldehyde. However, the sulfonic resins in principal use are the sulfonated copolymers of monoalkenyl aromatic hydrocarbons such as disclosed in U.S. Pat. No. 2,366,007.

Preferably, the strongly acidic ion exchange resins used in the present invention are of the latter type and comprise sulfonated insoluble copolymers of a major amount of at least one polymerizable monovinyl aromatic hydrocarbon, e.g., styrene, vinyltoluene, or ar-ethylvinylbenzene, with a minor amount, suitably from 2 to 10 percent by weight of the copolymer, of divinylbenzene. Commercially available resins of this type are those designated "Amberlite IR-120," "Amberlite IR-200," "Dowex 50," "Dowex 50W," "Duolite C-20," "Duolite C-25," "Ionac C-240," and "Ionac C-250," all of which are prepared by sulfonation of styrene-divinylbenzene copolymer beads with a sulfonating agent of choice, e.g., sulfuric acid, chlorosulfonic acid or sulfur trioxide.

After the solution of diluted reaction mixture is contacted with the strongly acidic resin, the non-basic substances comprising the major impurities are washed away using an aqueous organic medium. It is believed that the non-basic impurities are not bound or are only weakly bound by the resin whereas the hydroxylamine product and any other amine present are strongly bound to the resin due to reaction with the active sulfonic acid sites to form a salt. Whatever mechanism is responsible for the selective sorption of the hydroxylamine product and any amine impurities, the non-basic impurities are readily removed by an aqueous organic solution. The organic liquid used in the solution should have good eluting properties, i.e., provide a favorable environment for removal of the non-basic impurities and prevent their physical adsorption on the surface of the resin. Such organic liquids commonly referred to as "organic eluents" are well known in the art. Typical eluents which are miscible with water include ketones, e.g., acetone, and methyl ethyl ketone; alcohols, e.g., methanol and ethanol; and sulfoxides, e.g., dimethyl sulfoxide; but alcohols, and chiefly methanol, are preferred. Though not essential, the aqueous organic eluent used to remove the non-basic impurities from the resin is also used to dilute the crude reaction mixture to be contacted with the resin. The organic liquids used to dilute the reaction mixture and used as the organic eluent, whether the same or different, should be inert, i.e., non-reactive with the hydroxylamine product.

After substantially all of the non-basic impurities have been washed away, the resin is treated with an aqueous solution of a strong mineral acid, e.g., sulfuric acid or hydrochloric acid whereby the hydroxylamine product and any other amines that may be present are recovered from the resin. The acid solution containing the product is collected and after pH adjustment is extracted with an organic solvent to isolate the hydroxylamine product from the starting amine and other incidental alkaline impurities. The unreacted amine is left in the water solution from which it can be quantitatively recovered by adjusting its pH to a higher value and extracting with solvent or by distillation.

The concentrations of the respective eluting solutions and the amounts of each used to remove the non-basic and hydroxylamine fractions will vary widely depending upon the amount of resin, its exchange capacity, the selection of organic eluent and so forth and may be readily determined for a given set of conditions. A concentration of about 10% to 60% by weight of organic eluent in water has been found satisfactory. Ordinarily, the acid solution contains about 5% to 15% by weight of strong mineral acid. For all practical purposes, the minimum quantity of aqueous organic eluent used to elute the non-basic impurities will be that amount sufficient to remove substantially all of these substances, and likewise, the aqueous acid solution should be used in at least that amount necessary to recover substantially all of the sorbed hydroxylamine product.

In practice, the strongly acid ion-exchange resin is used in the form of a fixed bed. The bed of resin is flooded with water and thereafter, the diluted reaction mixture to be resolved containing an organic eluent is fed slowly to the bed so as to displace an equal volume of liquid from the bed. The resultant flow of liquid through the bed may be in any direction, but is preferably either upward or downward. The rate of flow is relatively slow and is adjusted so that upon contact with the feed solution, the resin has ample opportunity to sorb the hydroxylamine product. The liquid surrounding the resin granules from which the hydroxylamine product has been sorbed is then flushed from the bed by an inflow of aqueous solution of organic eluent. The flow of solution is continued until all of the non-basic impuirties are displaced. The resin bed is then washed with water, if desired, and then contacted with an aqueous solution of a mineral acid by flowing acidic solution through the bed of resin until substantially all of the sorbed hydroxylamine has been recovered and collected. The bed of resin is conveniently used in the form of a column prepared by packing wetted, granular resin material in a glass tube constricted at one end.

The acidic fraction comprising the hydroxylamine product is adjusted to a pH of about 6 and extracted, either batchwise or in a continuous manner, with an organic liquid which is an inert solvent for the hydroxylamine product and which is immiscible with the aqueous phase. Though not essential, the solvent preferably is a volatile liquid, thereby allowing easier isolation of the product from the organic phase, for example, by vacuum evaporation.

In adjusting the pH of the acid eluate, any suitable alkaline material may be used, e.g., alkali metal hydroxides such as sodium hydroxide. Before the hydroxylamine product is extracted into the organic solvent, the aqueous solution is preferably saturated with inorganic salts to effect better separation. Examples of salts commonly used for this purpose are the sulfates, chlorides, bromides and phosphates of ammonium, sodium, potassium, barium, calcium, magnesium and aluminum. Examples of water-immiscible organic solvents that may be used in the extraction step are aromatic hydrocarbons, e.g., benzene and toluene, chlorinated hydrocarbons, e.g., chloroform and methylene chloride; alcohols, e.g., n-amyl alcohol and n-hexyl alcohol; ethers, e.g., ethyl ether and isoamyl ether; ketones, e.g., diisopropyl ketone and methyl propyl ketone, and esters, e.g., ethyl acetate.

The present invention will be further illustrated by, but is not intended to be limited to, the following examples.

EXAMPLE 1

N,N-di(2-methoxyethyl)amine was prepared by oxidizing the corresponding secondary amine in a continuous manner as follows:

A first solution containing 815 g. of 98% N,N-di(2-methoxyethyl)amine, 1.75 g. of ethylenediaminetetraacetic acid, and 428 g. of distilled water was admixed in portions of 25 ml., with 25 ml. portions of a second solution containing 657 g. of 31.0% hydrogen peroxide and 685 g. of distilled water. The resultant mixture was continuously and progressively passed downwardly through a reaction column packed with glass beads and maintained at a temperature of about 103° C. As the peroxide became consumed, the effluent from the reaction was continuously withdrawn from the heated column, rapidly cooled to about room temperature to quench the reaction, and continuously collected. After about three and one-half hours, 2382 g. of crude reaction mixture was collected and contained 16.1% by weight of N,N-di(2-methoxyethyl)hydroxylamine and 8.7% by weight of unreacted N,N-di(2-methoxyethyl)amine.

The N,N-di(2-methoxyethyl)hydroxylamine product was separated from its crude reaction mixture and purified in accordance with the present invention as follows:

A 200 g. sample of the above crude reaction mixture was diluted with 50 ml. of distilled water and 316 ml. of methanol to give 540 ml. of solution. The solution contained 32.2 g. (0.216 mole) of the hydroxylamine product and 17.4 g. (0.131 mole) of starting amine.

The aqueous methanol solution of crude reaction mixture was added to a column comprising a strongly acidic ion exchange resin. The column used consisted of a glass tube 60 inches long having an inside diameter of 1 inch and was filled to a depth of 24 inches with ion exchange resin which was supported at the bottom of the column by a sintered glass disk. Liquids were added to the column from a 1-liter addition funnel secured at the top of the column by means of a rubber stopper. Eluate was removed from the bottom of the column by means of a stopcock. A second stopcock at the bottom of the column was used to admit water for backwashing.

The ion exchange resin employed was a sulfonated copolymer of styrene and divinylbenzene sold under the trademark "Amberlite IR-120(H)." The resin had a total exchange capacity of 1.9 meq. per ml. of wet resin in the column and a particle size (dry) of 20–50 mesh. The total exchange capacity for the 24 inch resin bed was about 592 meqs. or a practical capacity of about 300 meqs. (about 50% of the total exchange capacity). The resin in the column was introduced as a slurry with water. The diluted crude reaction mixture containing a total of 0.347 mole or 347 meqs. of amines was introduced at the top of the column at a rate of approximately 15 ml. per minute. After the crude reaction mixture was added, the column was then washed with 1500 ml. of 50% by weight methanol in distilled water at a rate of 15 ml. per minute for the first 250 ml. and at a rate of 30 ml. per minute for the remaining 1250 ml. Finally, the column was washed with 500 ml. of distilled water at a rate of 30 ml. per minute.

The column was then backwashed by admitting distilled water, totaling about 1 liter, from the bottom of the column at such a rate that the resin bed expanded to double its initial volume, with the resin beads in constant motion. After about 5 minutes, the resin bed was permitted to settle.

The hydroxylamine product and unreacted starting amine were recovered by regenerating the ion exchange resin with sulfuric acid, using 3 meq. of $H_2SO_4$ per meq.

of total exchange capacity of the resin. For this purpose, a total of 800 ml. of an 11% by weight solution of sulfuric acid (0.9 mole) in distilled water was eluted through the column at a rate of 15 ml. per minute. The column was then washed with distilled water at a rate of 15 ml. per minute until the eluate was no longer strongly acidic, and then at a rate of 30 ml. per minute until a total of 3000 ml. of wash water had been used. The column was then ready for the next batch. The eluate containing the hydroxylamine and amine was collected from the moment the eluate turned acidic until the washings were no longer strongly acidic (1050 ml.).

The pH of the 1050 ml. of acidic solution collected was adjusted to 6.0 with 126.2 g. of 50% sodium hydroxide solution using external cooling to keep the temperature below about 20° C. The solution was then saturated with sodium sulfate (approximately 35 g. of anhydrous salt) at 20° C.

The resulting aqueous solution was then extracted five times with 300 ml. portions of methylene chloride. The combined methylene chloride extracts were dried over anhydrous magnesium sulfate (25 g.), filtered, and the residue washed with an additional 100 ml. of methylene chloride. Residual solvent was removed on a rotary vacuum evaporator at 40° C. under 20 mm. pressure. The remaining volatile materials were removed by stirring at 25° C. under 0.1 mm. pressure for 3 hours. There was obtained 38.3 g. of oil containing 98.9% by weight of N,N-di(2-methoxyethyl)hydroxylamine product and 0.9% by weight of N,N-di(2-methoxyethyl)amine which corresponds to an 86.9% by weight recovery of product.

EXAMPLE 2

N,N-di(2-methoxyethyl)hydroxylamine was synthesized using the procedure given in Example 1 above. The crude reaction mixture obtained weighed 2340 g. and contained 16.3% of N,N-di(2-methoxyethyl)hydroxylamine and 8.3% of N,N-di(2-methoxyethyl)amine.

The pH of the crude reaction mixture was adjusted to 6.0 with 50% by weight sulfuric acid while the temperature was kept below about 20° C. using external cooling. The resulting solution was saturated with anhydrous sodium sulfate at room temperature and then extracted with ten successive 500 ml. portions of methylene chloride under an atmosphere of nitrogen. The combined extracts were dried over anhydrous magnesium sulfate, filtered and evaporated under 20 mm. pressure to yield 419 g. of an oil.

A portion of the oil (60.0 g.) containing the N,N-di(2-methoxyethyl)hydroxylamine was diluted to a volume of 500 ml. with 20% by weight aqueous methanol and added to an ion-exchange column as used in Example 1. The subsequent procedure, similar to that described in Example 1, consisted of washing the column with 3000 ml. of 20% by weight methanol in distilled water, backwashing with distilled water for 5 minutes, regenerating the resin with a solution of 90 g. of sulfuric acid in 800 ml. of distilled water to recover hydroxylamine product, and finally washing with 3000 ml. of distilled water. The acid eluate collected (1080 g.) was adjusted to pH 6.0, saturated with sodium sulfate and extracted with methylene chloride as in Example 1. After removal of solvent and volatile impurities, there was obtained a product containing 99.4% by weight of N,N-di(2-methoxyethyl)hydroxylamine and 0.09% by weight of N,N-di(2-methoxyethyl) amine. The recovery of material was 83.7% by weight.

From the above examples, it will be readily apparent that N-substituted hydroxylamines of excellent purity may be recovered in a simple and efficient manner from their crude reaction mixtures using the process of the present invention. Besides a purity consistenly well above 90%, the present process offers a rapid and economical procedure for recovering N-substituted hydroxylamines in improved amounts.

As will be apparent to those skilled in the art, certain modifications may be made in the above procedure while still achieving the benefits of the present invention. For example, organic eluents and organic solvents other than methanol and methylene chloride may be used, and other strongly acidic ion exchange resins may be employed. Also, other mineral acids and other alkalis may be substituted for the particular ones used in the examples. The size of the column may be adjusted to provide the desired capacity and the rates of flow for the various liquids applied thereto may be varied to obtain the optimum conditions necessary for elution of the respective fractions. The extraction of hydroxylamine product into a suitable organic solvent need not be carried out batchwise but may be accomplished in a continuous manner while any suitable means may be used to eliminate solvent and other volatiles from the isolated product.

As previously mentioned, N-substituted hydroxylamines are useful as developing agents in photographic processes, and for this purpose are desirably of very high purity, such as, the products isolated according to the method of the present invention. These compounds may be used as developing agents in conventional or wet development of silver halide emulsions, diffusion transfer processes, both dye and silver, and are especially useful in such photographic processes wherein it is desired to elminate or minimize the need for washing or stabilizing operations in liquid baths subsequent to the formation of the silver print. Examples of such processes are disclosed in U.S. Pat. No. 3,293,034 to Milton Green et al.

In diffusion transfer processes of this type, as is well known in the art, an exposed silver halide emulsion is treated with a liquid processing composition while in superposed relationship with an image-receiving material. The liquid processing composition develops exposed silver halide to silver and reacts with unexposed silver halide to form a complex silver salt which is transferred to the image-receiving material and there reduced to silver to form a positive print. The processing composition includes a silver halide solvent, such as sodium thiosulfate, and may also contain a film-forming material for increasing the viscosity of the composition. As used herein, the term "silver halide solvent" refers to reagents which will form a soluble complex with silver halide as is well known in the art of forming silver images by transfer.

Since certain changes may be made in the above compositions and processes without departing from the scope of the invention herein involved, it is intended that all matter contained in the above description shall be interpreted as illustrative and not in a limiting sense.

What is claimed is:

1. A process of separating an N-substituted hydroxylamine from a reaction mixture containing said hydroxylamine, unreacted starting amine and non-basic impurities which comprises, in combination, the steps of:
   (a) contacting a solution of the reaction mixture in water and a water-miscible organic liquid selected from a ketone, alcohol and sulfoxide with a strongly acidic ion exchange resin of a sulfonated copolymer of a major amount of at least one monovinyl aromatic hydrocarbon and a minor amount of divinylbenzene,
   (b) treating the contacted resin with an aqueous solution of a water-miscible organic eluent selected from a ketone, alcohol and sulfoxide to remove said non-basic impurities from said contacted resin,
   (c) subsequently treating said contacted resin with an aqueous solution of a strong mineral acid to remove said hydroxylamine from said resin,
   (d) adjusting the pH of the resulting aqueous acid solution to about 6, and
   (e) extracting the aqueous solution with a water-immiscible organic solvent selected from an aromatic hydrocarbon, chlorinated hydrocarbon, alcohol, ketone, ether and ester to recover said hydroxylamine therefrom, said hydroxylamine corresponding to the formula:

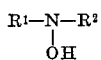

wherein each of $R^1$ and $R^2$ are independently selected from the group consisting of hydrogen, alkyl, cycloalkyl, alkoxyalkyl, aralkyl, alkoxyalkoxyalkyl and an alkenyl radical, not more than one of $R^1$ and $R^2$ being hydrogen.

2. A process according to claim 1 wherein said water-miscible organic liquid is an alcohol.

3. A process according to claim 1 wherein said water-immiscible organic solvent is a chlorinated hydrocarbon.

4. A process according to claim 1 wherein said resin is in the form of a fixed bed.

5. A process according to claim 1 wherein said resin is a sulfonated copolymer of styrene and divinylbenzene.

6. A process according to claim 1 wherein said water-miscible organic eluent is an alcohol.

7. A process according to claim 6 wherein said water-miscible organic eluent is methanol.

8. A process according to claim 2 wherein said water-miscible organic liquid is methanol.

9. A process according to claim 1 wherein said acid is sulfuric acid.

10. A process according to claim 3 wherein said water-immiscible organic solvent is methylene chloride.

11. A process according to claim 1 comprising, prior to step (a), the steps of adjusting the pH of the reaction mixture in water to about 6, extracting the aqueous solution with a water-immiscible organic solvent selected from an aromatic hydrocarbon, chlorinated hydrocarbon, alcohol, ketone, ether and ester, removing the organic solvent from the extract, and diluting the residue with an aqueous solution of a water-miscible organic eluent selected from a ketone, alcohol and sulfoxide.

12. A process according to claim 11 wherein said water-immiscible organic solvent is methylene chloride.

13. A process according to claim 11 wherein said water-miscible organic eluent is methanol.

14. A process according to claim 1 wherein said N-substituted hydroxylamine is an N,N-disubstituted hydroxylamine.

15. A process according to claim 14 wherein said N,N-disusbtituted hydroxylamine is N,N-di(2-methoxyethyl) hydroxylamine.

References Cited
UNITED STATES PATENTS 3,243,462   3/1966   Smith _____ 260—583 DD JOSEPH REBOLD, Primary Examiner
R. L. RAYMOND, Assistant Examiner U.S. Cl. X.R.

260—268 R, 293 R, 326.8, 563 R, 570.8 R, 570.9, 583 DD 584 B